UNITED STATES PATENT OFFICE.

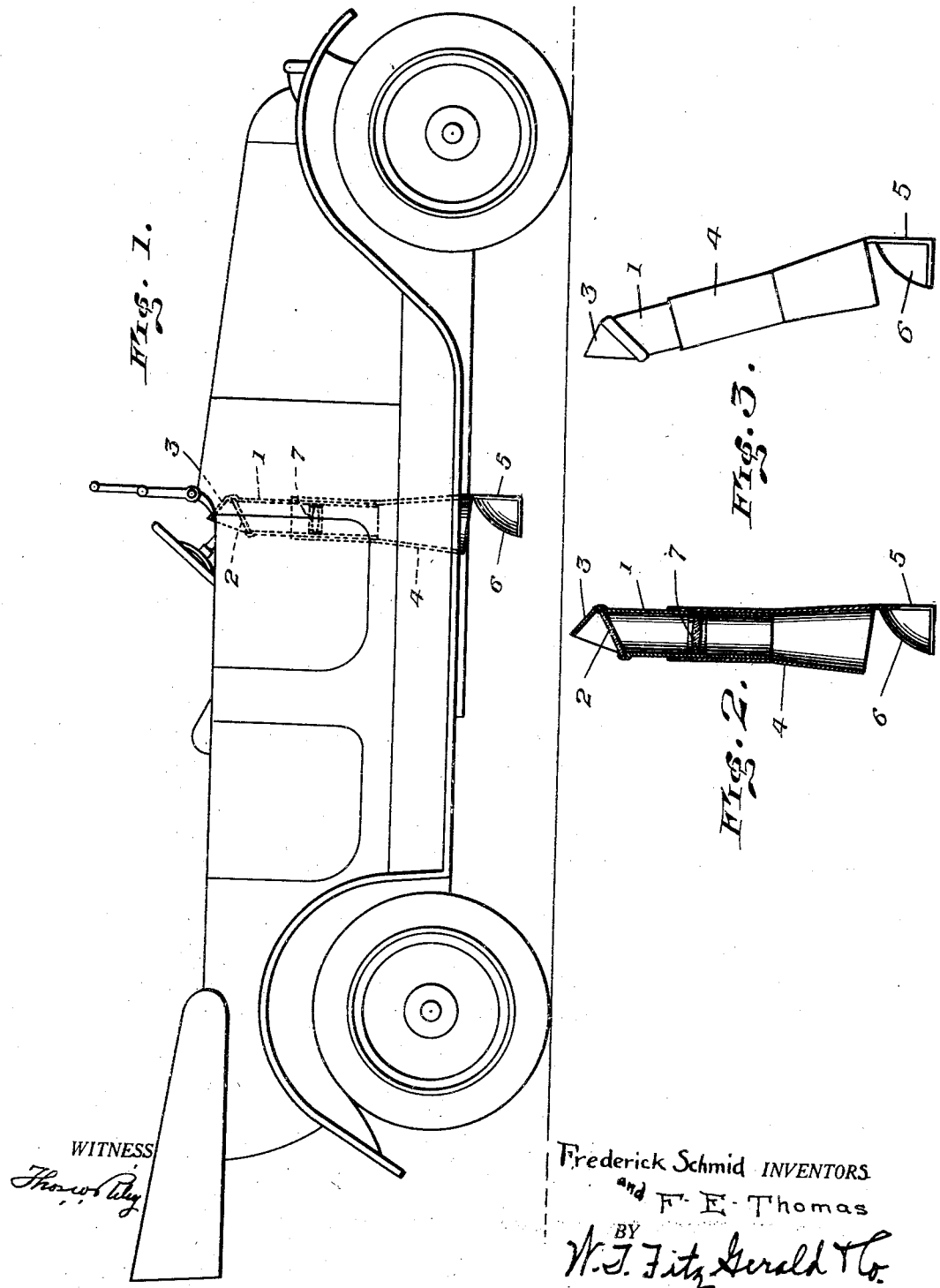

FREDERICK SCHMID, OF DENVER, COLORADO, AND FRED EVERETT THOMAS, OF OKLAHOMA, OKLAHOMA.

VEHICLE-REFLECTOR.

1,318,603. Specification of Letters Patent. Patented Oct. 14, 1919.

Application filed February 13, 1919. Serial No. 276,760.

*To all whom it may concern:*

Be it known that we, FREDERICK SCHMID and FRED E. THOMAS, citizens of the United States, residing at Denver, Colorado, and Oklahoma, Okla., respectively, have invented certain new and useful Improvements in Vehicle-Reflectors; and we do hereby declare the following to be a full, clear, and exact description of the invention, such as will enable others skilled in the art to which it appertains to make and use the same.

The present invention relates to a reflector or periscope for use on automobiles, street cars, and other vehicles, and it is the object of the invention to provide a novel and improved device of that character for use on vehicles, and so constructed and arranged that the operator, through the medium of the present device, can observe the conditions of traffic behind him in order to facilitate traffic and avoid collisions and accidents.

It is also the object to provide such a device which can be readily installed on various vehicles, and which is simple and inexpensive in construction as well as being practicable and serviceable in use.

A further object is the provision of such a reflector or periscope which will effectively reflect the light rays from the rear to a point where the operator has an image before him of the objects in rear, thereby permitting him to observe any vehicles following behind him, without looking around or becoming confused.

With the foregoing and other objects in view which will be apparent as the description proceeds, the invention resides in the construction and arrangement of parts hereinafter described and claimed, it being understood that changes can be made within the scope of what is claimed without departing from the spirit of the invention.

The invention is illustrated in the accompanying drawing, wherein:—

Figure 1 is a side elevation of an automobile showing the reflector or periscope applied.

Fig. 2 is a longitudinal section of the reflector, portions being shown in elevation.

Fig. 3 is a side elevation showing a modified form.

Although the reflector or periscope is shown as applied to a motor vehicle, it will be understood at the outset that same can be installed on various vehicles, such as street cars and the like. Furthermore, the device can be installed in various positions, that is, the outer end or that on the exterior of the vehicle can project below the body thereof, to one side, or upwardly according to the circumstances. In the drawing, the reflector is shown as extending downwardly through the floor of the car near the dash, which is the preferred way of using the device on a motor vehicle.

The reflector or periscope comprises telescoping tubes or sections, the inner one of which, designated 1, has at its inner end a ground glass panel 2 on which the image is thrown, and this panel is preferably inclined, when the vision is at an angle to the axis of the device, so that the operator can readily observe the image. The inner end of said tube 1 also has a hood 3 over the image panel or glass 2 to shade it and make the image brighter. The outer section 4 of the telescoping body is provided at its outer end with a bracket 5 supporting a convexed or partially-spherical mirror or reflector proper 6 located beyond the outer end of the tube 4. A lens 7 is mounted within the tube 1, and the light rays which are reflected from the rear by the mirror 6 are directed through the lens 7 so that the picture or view is thrown on the glass 2 where it can be readily observed by the operator. The mirror 6 will reflect the light rays from in rear and from both sides in rear of the vehicle inwardly through the casing or body, so that the operator has a picture before him of the conditions of traffic in the rear to guide him in his control of the vehicle, and to avoid collisions and accidents. The adjustment of the tubes 1 and 4 permits a proper focus being obtained, and also permits of adjustments so that the mirror 6 can be located below or to the exterior of the vehicle body. The present device will therefore add to the safety of operation of the vehicle, because the operator has within his vision, without turning around or trying to look behind, a picture of the view in rear of the vehicle and toward both sides. This gives a much better view than can be had by the use of a single reflector at the side of the vehicle, as has been the prevailing practice.

As shown in Figs. 1 and 2 the device is arranged vertically; but it may be disposed at an angle, as seen in Fig. 3 instead of at right angles to the line of movement of the vehicle.

Having thus described the invention, what is claimed as new is:—

1. A reflector for vehicles comprising a casing having telescoping tubes, an image glass or member and a convexed mirror carried by said tubes at the opposite ends thereof, said mirror being disposed in a position to reflect light rays from in rear of the vehicle through said tubes, a lens within one tube between said mirror and glass, and a hood overhanging said glass and carried by the corresponding tube.

2. A reflector for vehicles comprising a casing adapted to extend from within a vehicle to the exterior, a convexed mirror supported at the outer end of the casing for reflecting light rays from in rear of the vehicle into the casing, an oblique image glass or member carried by the inner end of the casing, a hood carried by the inner end of the casing and shading said glass, and a lens within the casing between said mirror and glass.

In testimony whereof we have signed our names to this specification.

FREDERICK SCHMID.
FRED EVERETT THOMAS.